(12) United States Patent
Basos

(10) Patent No.: US 7,350,323 B1
(45) Date of Patent: Apr. 1, 2008

(54) LICENSE PLATE FRAME WITH USER-CONFIGURABLE INDICIA

(76) Inventor: William Basos, 10 Ballard St., Binghamton, NY (US) 13904

( * ) Notice: Subject to any disclaimer, the term of this patent is extended or adjusted under 35 U.S.C. 154(b) by 80 days.

(21) Appl. No.: 11/157,535

(22) Filed: Jun. 21, 2005

(51) Int. Cl.
G09F 7/00 (2006.01)
(52) U.S. Cl. .......................................... 40/209; 40/210
(58) Field of Classification Search ................. 40/209, 40/210, 200, 618, 575, 576, 798, 799
See application file for complete search history.

(56) References Cited

U.S. PATENT DOCUMENTS

| | | | | |
|---|---|---|---|---|
| 1,498,889 A | * | 6/1924 | Snell | 40/210 |
| 1,660,575 A | * | 2/1928 | Overton | 40/209 |
| 1,851,917 A | * | 3/1932 | Maggio | 40/799 |
| 1,985,227 A | * | 12/1934 | Bland | 40/200 |
| 2,869,261 A | | 1/1959 | Audette | |
| 3,755,945 A | | 9/1973 | McEwan | |
| 4,736,539 A | | 4/1988 | Dickinson | |
| 4,924,611 A | * | 5/1990 | Shaw | 40/210 |
| 5,357,701 A | * | 10/1994 | Grate | 40/618 |
| 5,383,294 A | | 1/1995 | Shen | |
| 5,878,516 A | | 3/1999 | Amirian | |

FOREIGN PATENT DOCUMENTS

FR        587170    *   1/1925   .................. 40/209

* cited by examiner

*Primary Examiner*—Cassandra Davis
(74) *Attorney, Agent, or Firm*—Mark Levy & Associates, PLLC

(57) ABSTRACT

A license plate frame that provides great versatility in displaying a user-changeable message on a portion thereof. The design provides a channel adapted to receive individual, planar tiles, each typically bearing indicia. Blank spacer tiles may also be provided but, because of the novel locking mechanism, are unnecessary. Tiles may bear indicia consisting of letters, numerals, punctuation marks, symbols, phrases, or other graphics such as logotypes. Also because of the unique tile locking mechanism, tiles may have varying width and it is unnecessary to pad out an entire row of tiles. This allows, among other things, the use of proportional type fonts. Secure channel end locks keep tiles from being easily removed, thereby preventing theft or vandalism. The combination of tile locking and channel end locks provide a rugged system that may withstand automated car washes and other environmental onslaughts.

17 Claims, 4 Drawing Sheets

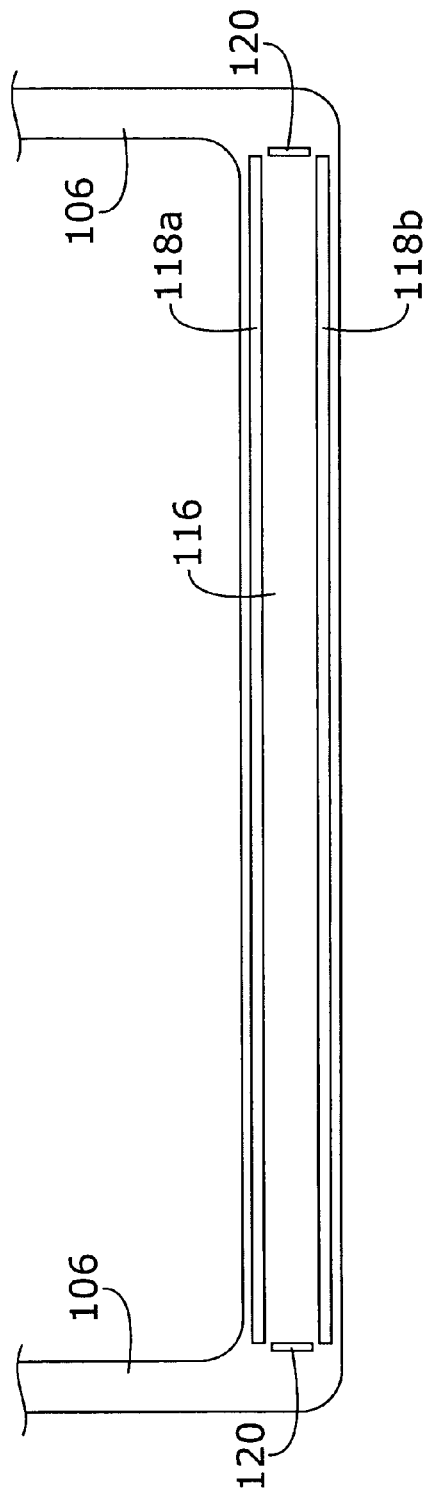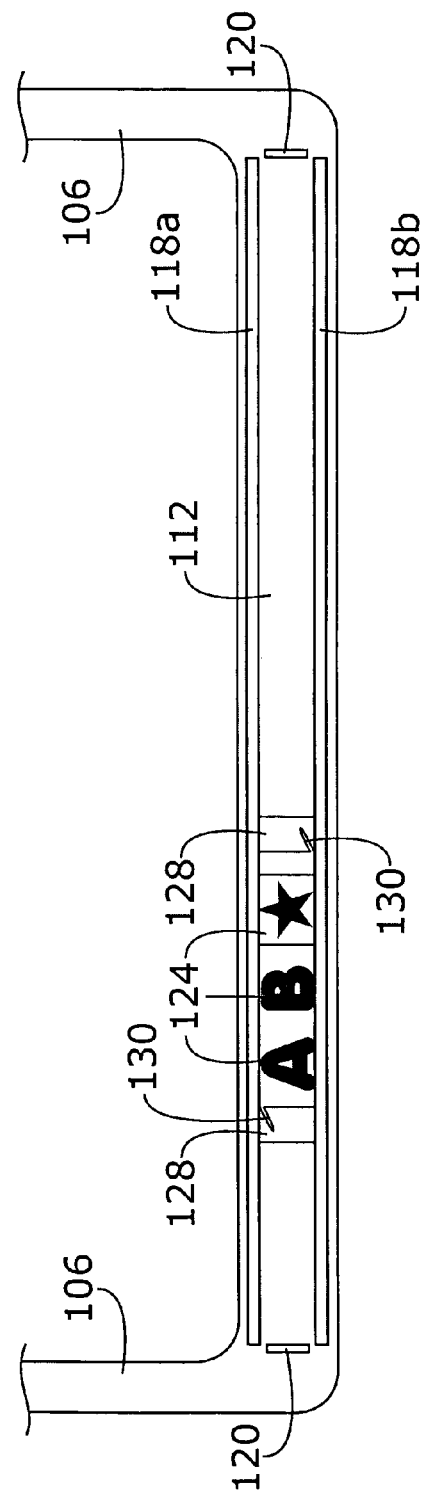

LICENSE PLATE FRAME WITH USER-CONFIGURABLE INDICIA

FIELD OF THE INVENTION

The present invention pertains to license plate frames and the like and, more particularly, to a license plate frame adapted to display user-configurable indicia.

BACKGROUND OF THE INVENTION

People seem to have a universal urge to personalize their belongings. Such personalization typically takes the form of their name or initials, an affiliation with a particular group, their support of a cause, organization, sports team, etc., or a favorite pet. Automobiles or other vehicles belonging to such people are no exception.

So-called vanity license plates have provided a range of possibilities for personalization. However, vanity plates allow only a limited number of characters (only seven letters, numbers, or symbols in New Hampshire) to be displayed and are available as a one-of-a-kind item on a first come, first served basis. Consequently, vanity places offer very limited possibilities for personalization.

Bumper stickers provide another way in which a person may display a desired message on his or her vehicle. However, bumper stickers suffer from several problems. First, they are often difficult to adhere well to the vehicle when being installed. Bumper stickers are generally paper or plastic and often the indicia printed thereupon fades when exposed to prolonged sunlight. They are also subject to removal or, worse, partial removal when the vehicle is washed. Once installed, they are often difficult or impossible to remove from the vehicle without damage to the vehicle finish. Providing a bumper sticker with a truly personalized message requires special equipment not readily available to an automobile owner.

Another way such customization may be accomplished is by using a customized license plate frame to hold and secure the license plate of the vehicle. Many off-the-shelf frames bearing catch phrases such as "I'd Rather Be Golfing", "My Other Car is a Broom", or custom license plate frames displaying indicia advertising a car dealership are well known.

While such license plate frames may fill the needs of a certain percentage of the population, those truly driven by the customization urge are not satisfied with such solutions. No provision is made for customization at the whim of a particular automobile owner. Consequently, while these particular types of frames may provide slogans or advertising, they do little to fill the need for true personalization or customization.

DISCUSSION OF THE RELATED ART

License plate frames allowing a certain amount of customization are known in the prior art. For example, U.S. Pat. No. 2,869,261 for FRAMES FOR VEHICLE LICENSE PLATES OR THE LIKE, issued Jan. 20, 1959 to Benjamin J. Audette discloses a license plate frame which may have letters inserted into a mounting strip or a plate on which letters of the alphabet may be mounted to spell out the name of the owner or another short message. The letters are held in position only by gripping fingers on the individual letters.

U.S. Pat. No. 3,755,945 for VEHICLE LICENSE PLATE HOLDER, issued Sep. 4, 1973 to Thomas A. McEwen et al. provides another license frame adapted to display custom indicia. McEWEN et al. provide a horizontal region at the bottom of the frame upon which advertising or personal lettering may be applied.

U.S. Pat. No. 4,736,539 for BUMPER STICKER HOLDER, issued Apr. 12, 1988 to Nathan L. Dickinson provides another frame for use on a motor vehicle to protect a bumper sticker rather than a license plate. DICKINSON provides a method wherein the entire frame is given over to displaying custom indicia (i.e., the message of the protected bumper sticker).

U.S. Pat. No. 4,924,611 for FRAMES FOR VEHICLE LICENSE PLATES AND THE LIKE, issued May 15, 1990 to Stuart Shaw provides a license plate frame allowing a series of individual letters forming words to be retained in a track along the bottom edge of the license plate frame. In alternate embodiments of the SHAW frame, a single strip bearing a predetermined message is carried in the track.

U.S. Pat. No. 5,383,294 for VARIABLE NUMBER PLATE FIXING FRAME FOR VEHICLE, issued Jan. 24, 1995 to Shun T. Shen provides a license plate frame adapted to receive custom stickers in areas at both the top and bottom of the frame. In addition, SHEN provides interchangeable side brackets having a decorative appearance. The SHEN side brackets may be interchanged without removing either the frame from the vehicle or the license plate from the frame.

U.S. Pat. No. 5,878,516 for VEHICLE BILLBOARD issued Mar. 9, 1999 to Partev Amirian provides an ancillary display device for attachment to a conventional license plate frame. The AMIRIAN apparatus is adapted for displaying a single, contiguous message and, in its preferred embodiment, appears to contain a non-interchangeable message. Rather, the entire frame assembly is interchangeable. A new billboard with a different message may be interchanged with an existing billboard when it is desired to change the message.

None of these patents, individually, or in combination, appears to teach or suggest the novel, indicia-displaying, license plate frame of the invention.

SUMMARY OF THE INVENTION

In accordance with the present invention, there is provided a license plate frame that provides great versatility in displaying a user-changeable message on a portion thereof. The novel design provides a channel adapted to receive individual, planar tiles, each typically bearing indicia. Blank spacer tiles may also be provided but, because of the novel locking tiles, such blank spacer tiles are generally unnecessary.

Tiles may bear indicia consisting of letters, numerals, punctuation marks, symbols, phrases or other graphics, for example, logotypes. Also, because of the unique tile locking mechanism, tiles may have varying widths; it is not necessary to pad out an entire row of tiles in order to secure the tiles or to prevent horizontal movement thereof. This allows, among other things, the use of variable spaced (i.e., proportional) type fonts.

Secure channel end locks keep tiles from being easily removed, thereby preventing theft or vandalism. Such vandalism may unfortunately, include rearranging the tiles into a vulgar, obscene, slanderous, racist, prejudicial, or politically incorrect message. The combination of tile locking and channel end locks provides a rugged system that may withstand vandals, automated car washes and other environmental onslaughts. The license plate frame of the invention is typically injection molded from a thermoplastic compound and may be inexpensively manufactured.

It is, therefore, an object of the invention to provide a license plate frame for displaying user-configured indicia.

It is another object of the invention to provide a license plate frame wherein indicia is formed from individual, planar tiles.

It is a further object of the invention to provide a license plate frame wherein indicia-bearing tiles may have different widths.

It is an additional object of the invention to provide a license plate frame wherein tiles may be positioned and secured, individually or in groups of tiles, within the channel.

It is another object of the invention to provide a license plate frame wherein indicia may be letters, numerals, symbols, punctuation marks, phrases, or other graphics.

It is a still further object of the invention to provide a license plate frame wherein indicia on individual tiles may have attributes independent of the attributes of indicia on other tiles.

It is yet another object of the invention to provide a license plate frame wherein indicia attributes include color, font, style, size, reflectivity, and luminosity.

It is an additional object of the invention to provide a license plate frame wherein tiles may not be removed easily from the frame without first removing the license plate frame from the vehicle itself.

BRIEF DESCRIPTION OF THE DRAWINGS

A complete understanding of the present invention may be obtained by reference to the accompanying drawings, when considered in conjunction with the subsequent detailed description, in which:

FIGS. 3a and 3b are schematic views of the channel portion of the license plate frame of FIG. 1, without and with indicia-bearing tiles installed, respectively;

DETAILED DESCRIPTION OF THE PREFERRED EMBODIMENT

The present invention features a license plate frame both for protecting an automobile's license plate and for securely displaying user-changeable indicia.

Figure 1:
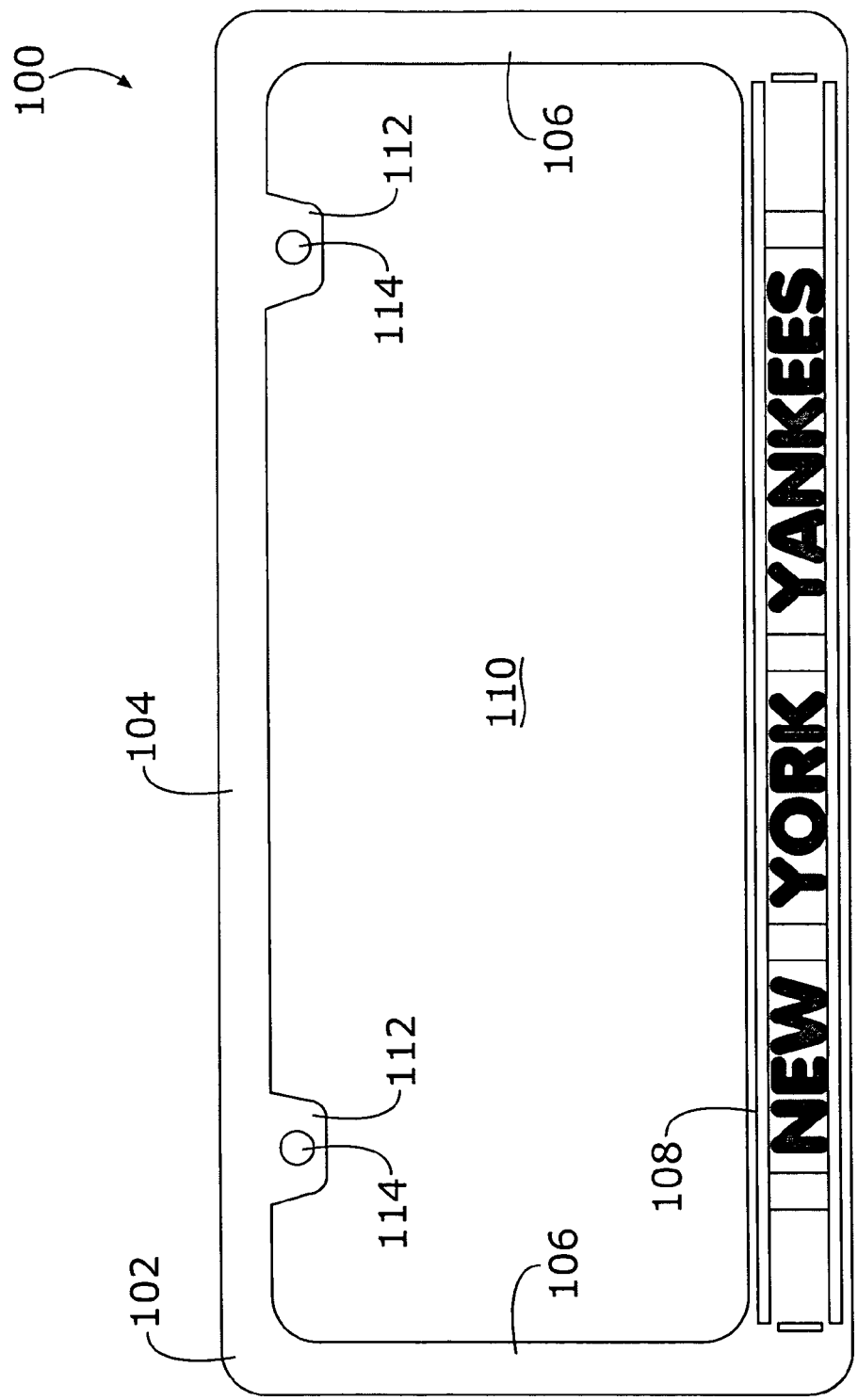
FIG. 1 is a front, elevational view of the license plate frame of the invention.

Referring first to FIG. 1, there is shown a front, elevational view of the license plate frame 100 of the invention. A frame perimeter 102 has a top portion 104, two parallel side portions 106, and a bottom portion 108. Frame 100 is adapted and configured to surround a standard license plate, not shown, which is inserted into frame perimeter 102 from the rear side of frame 100 and retained therewithin. Indicia on the licenses plate is visible in central opening 110.

Tabs 112 protrude from upper portion 104 of frame perimeter 102 into central opening 110. Through-holes 114 are provided for mounting frame 100 with a license plate, not shown, to universal mounting arrangements found on automobiles, trucks, busses, or other such vehicles, not shown. Holes 114 are sized to accept standard mounting hardware, not shown, useful for securing frame 100 to a vehicle.

Figure 2:
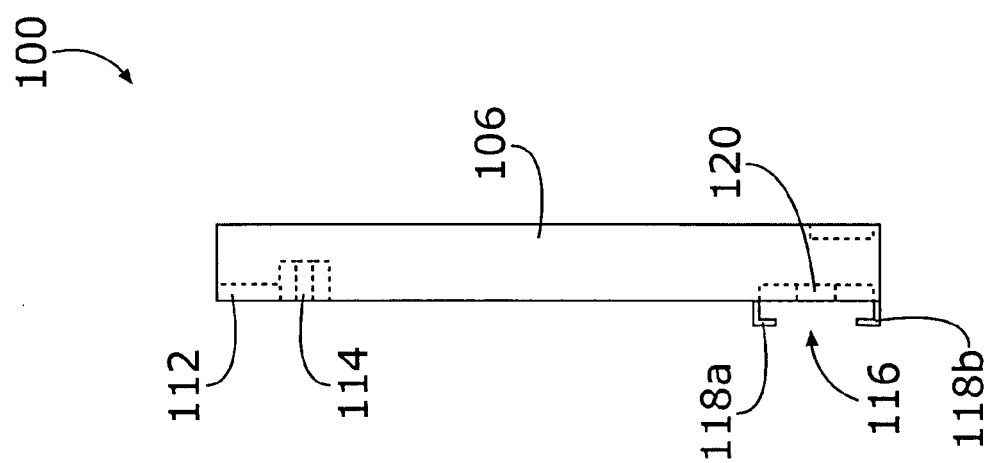
FIG. 2 is a side, elevational, cross-sectional view of the license plate frame of FIG. 1.

Referring now to FIGS. 2, 3a, and 3b, there are shown side, elevational, cross-sectional, and front, schematic views of the channel portion of the license plate frame 100 without and with indicia-bearing tiles installed, respectively. Disposed on a lower front portion of frame perimeter portion 102 is a channel or track 116 formed by an upper lip 118a and a lower lip 118b. An opening 120 disposed in lower frame portion 108 is provided at each end of channel 116 to receive channel end locks 122. Openings 120 typically completely penetrate lower portion 108 of frame perimeter 102.

A plurality of indicia-bearing tiles 124, best seen in FIG. 3b, are sized so as to be slidably received between top lip 118a and bottom lip 118b of channel or track 116. The term tile is used herein to refer to any article insertable into track 116; the term is not intended to be limited to a flat, rectangular article.

Figure 4A:
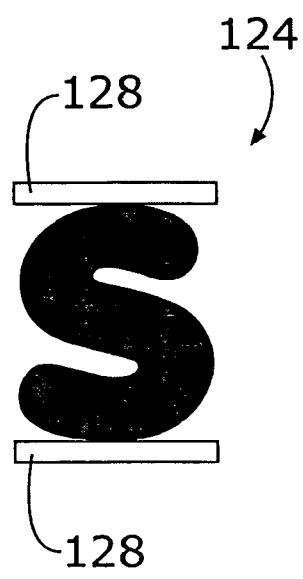
FIGS. 4a and 4b are schematic plan views of tiles representing a single letter and a symbol-bearing tile, respectively.
Figure 4B:
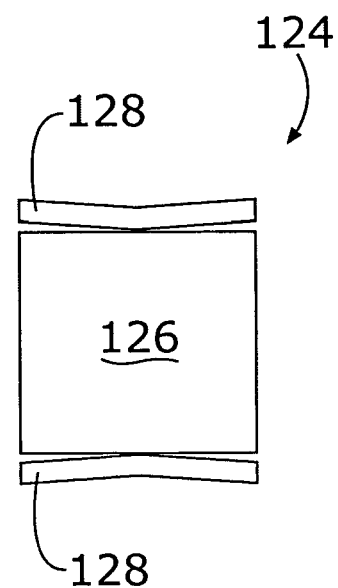
Figure 5:
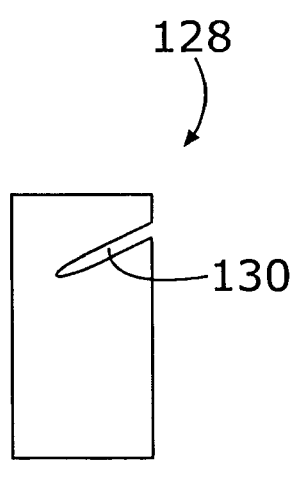
FIG. 5 is a schematic plan view of a planar locking tile.

Referring now also to FIGS. 4a and 4b, there are shown detailed views of two types of indicia-bearing tiles. FIG. 4a represents an individual, raised letter 124 while FIG. 4b represents a planar, rectangular tile 124 adapted for receiving indicia, not shown, on a face 126 thereof. Resilient bars 128 attached to both the top and bottom edges of indicia-bearing tiles 124, may be captured under respective ones of upper lip 118a and lower lip 118b. Because bars 128 are resilient, they must be slightly inwardly compressed for insertion into channel 116. When indicia-bearing tiles 124 are positioned horizontally along channel 116, an outward pressure exerted by bars 128, helps retain the indicia-bearing tile 124 at its intended position. Moreover, bars 128 act as spacers so that contiguous letters or designs remain properly spaced apart for legibility.

It will be recognized that indicia-bearing tiles 124 may have a wide range of configurations. Three-dimensional, individual characters such as that illustrated in FIG. 4a are useful. As long as indicia-bearing tile 124 has a standard height, determined by the spacing of upper lip 118a and lower lip 118b, and has a bar 128 or equivalent, it may be used in the license plate frame of the invention.

The possibilities for designs, characters, logos, symbols, and expressions that may be inscribed upon the face of an indicia-bearing tile 125 are seemingly endless, limited only by the imagination of the end user. Therefore, the invention is not considered limited to the particular forms of indicia-bearing tiles 124 chosen for purposes of disclosure. Rather, the invention includes any and all forms of indicia having a suitable physical configuration so as to be accommodated within track 116.

One or more locking tiles 128 having a relief slot 130 disposed diagonally therein may be used to hold either a single one or a group of indicia-bearing tiles 124 at a desired position along channel 116. The overall height of locking tiles 128 is slightly greater than the height of indicia-bearing tiles 124. The thickness of locking tiles is maintained such that both the lower and upper edges thereof fit snugly under respective upper and lower lips 118a, 118b. When locking tile 128 is slid into channel 116, an upper or lower portion (depending upon the insertion orientation) thereof is compressed slightly as allowed by relief slot 130. Consequently, locking tile 128 is prevented from easy movement horizontally along channel 116. It will be recognized that many other mechanisms may be used to provide a locking tile 128 and the invention is not considered limited to the embodiment of locking tile 128 chosen for purposes of disclosure.

Figure 6:
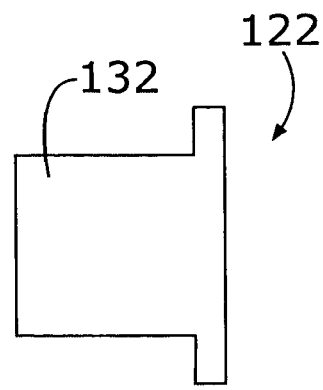
FIG. 6, is a side, elevational view of the channel end lock of the invention.

Referring now also to FIG. 6, there is shown an elevational view of a channel end lock 122. Channel end lock 122 has a portion 132 sized and adapted for frictional retention in opening 120. Portion 132 protrudes from the major plane of a frame 100, preferably at a right angle thereto.

In use, the license plate frame 100 of the invention is typically configured prior to insertion of a license plate thereinto and the subsequent attachment of the frame/license plate combination to a vehicle. Before channel end locks 122 are inserted into openings 120, combinations of indicia-bearing tiles 124 may be inserted into either end of channel 116. Locking tiles 128 may be interspersed with indicia-bearing tiles 124 to provide indicia arrangements in accordance with the desires of a user. Once all indicia-bearing tiles 124 and locking tiles 128 are inserted into channel 116, channel end locks 122 are inserted from the rear of license plate frame 100 through openings 120 such that protruding portions 132 of end locks 122 project into channel 116 and thereby prevent removal of indicia-bearing tiles 124 and/or locking tiles 128.

After channel end locks 122 are inserted from the rear of license plate frame 100, a license plate, not shown, may be inserted into license plate frame 100 and the frame/license plate assembly may be secured to the vehicle using screws or other suitable fasteners, not shown, inserted through holes 114. Once attached to a vehicle, channel end locks 122 are held securely in position by pressure against them provided by a license plate, not shown, in license plate frame 100.

It will be recognized that indicia on indicia-bearing tiles 124 may have many attributes. Some attributes include fonts, colors, styles, size, etc. Indicia may be constructed to glow in the dark (i.e., exhibit luminescence). In other cases, indicia may be highly reflective. Because it is not necessary to pad out a line of indicia-bearing tiles 124, tiles may vary in width. This allows the use of proportionally spaced type fonts that may be used to create longer messages than with fixed width type fonts. Indicia-bearing tiles 124 including graphic art such as logotypes may be intermixed with characters.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A frame for displaying a license plate and for displaying user-configurable indicia thereupon, comprising:
   a) a frame adapted to receive and substantially surround the perimeter of a license plate while exposing an indicia-bearing face of said license plate for viewing;
   b) a plurality of individual, substantially planar tiles each having a width, a predetermined, uniform thickness absent a step therein, and a predetermined, substantially identical height, at least some of said plurality of individual tiles being adapted to bear indicia on an outer face thereof;
   c) a channel disposed on an outer surface of said frame adapted to slidably receive said tiles therein, said channel having an opening compatible with said predetermined thickness and said height of said plurality of tiles, said channel having at least one open end adapted to slidably receive said plurality of tiles thereat;
   d) at least one substantially planar tile having a unitary locking mechanism and having a thickness substantially identical to said predetermined, uniform thickness of said plurality of individual tiles releasably and slidably disposed in said channel and adapted to maintain a position of at least one of said plurality of individual tiles along said channel; and
   e) means for locking disposed adjacent said at least one open end of said channel for retaining said plurality of individual tiles and said locking tiles therewithin, said means for locking comprising a locking clip penetrating a rear surface of said channel.

2. The frame for displaying a license plate as recited in claim 1, wherein any of said plurality of individual tiles selectively bear indicia on a face thereof.

3. The frame for displaying a license plate as recited in claim 2, wherein said indicia is selected from the group consisting of a letter, a numeral, a punctuation mark, a symbol, a graphic, and a phrase.

4. The frame for displaying a license plate as recited in claim 2, wherein said indicia is selected from the group consisting of color, style, font, reflectivity, and luminosity.

5. The frame for displaying a license plate as recited in claim 4, wherein said font comprises a proportional font.

6. The frame for displaying a license plate as recited in claim 4, wherein said indicia is luminous (i.e., glows in the dark).

7. The frame for displaying a license plate as recited in claim 1, wherein said locking clip is installed and removed from a rear surface of said frame.

8. The frame for displaying a license plate as recited in claim 7, wherein a license plate installed in said frame prevents access to said locking clip.

9. The frame for displaying a license plate as recited in claim 1, wherein said plurality individual, substantially planar tiles comprise a resilient bar disposed at least one of a top and a bottom edge thereof, said resilient bar being adapted to interact with a respective upper and lower region of said channel.

10. A frame for displaying a license plate and for displaying user-configurable indicia thereupon, comprising:
   a) a frame adapted to receive and substantially surround the perimeter of a license plate while exposing an indicia-bearing face of said license plate for viewing;
   b) a plurality of individual, substantially planar tiles each having a width, a predetermined, uniform thickness absent a step therein, and a predetermined, substantially identical height, at least some of said plurality of individual tiles being adapted to bear indicia on an outer face thereof;
   c) a channel disposed on an outer surface of said frame adapted to slidably receive said tiles therein, said channel having an opening compatible with said predetermined thickness and said height of said plurality of tiles, said channel having at least one open end adapted to slidably receive said plurality of tiles thereat;
   d) at least one substantially planar tile having a unitary locking mechanism and having a thickness substantially identical to said predetermined, uniform thickness of said plurality of individual tiles releasably and slidably disposed in said channel and adapted to maintain a position of at least one of said plurality of individual tiles along said channel; and e) means for locking disposed adjacent at least one of said at least one open end of said channel for retaining said plurality of individual tiles and said locking tiles therewithin, said means for locking comprising a locking clip penetrating a rear surface of said channel.

11. The frame for displaying a license plate as recited in claim 10, wherein any of said plurality of individual tiles selectively bear indicia on a face thereof.

12. The frame for displaying a license plate as recited in claim 11, wherein said indicia is selected from the group: consisting of a letter, a numeral, a punctuation mark, a symbol, a graphic, and a phrase.

13. The frame for displaying a license plate as recited in claim 11, wherein said indicia is selected from the group consisting of color, style, font, reflectivity, and luminosity.

14. The frame for displaying a license plate as recited in claim 13, wherein said font comprises a proportional font.

15. The frame for displaying a license plate as recited in claim 13, wherein said indicia is luminous (i.e., glows in the dark).

16. The frame for displaying a license plate as recited in claim 10, wherein said locking clip is installed and removed from a rear surface of said frame and wherein a license plate installed in said frame prevents access to said locking clip.

17. The frame for displaying a license plate as recited in claim 10, wherein said plurality individual, substantially planar tiles comprise a resilient bar disposed at least one of a top and a bottom edge thereof, said resilient bar being adapted to interact with a respective upper and lower region of said channel.

* * * * *